Oct. 8, 1963
T. R. THOMAS
3,106,346
SYSTEM FOR DISTRIBUTING FLUIDS
Filed April 30, 1958
5 Sheets-Sheet 1
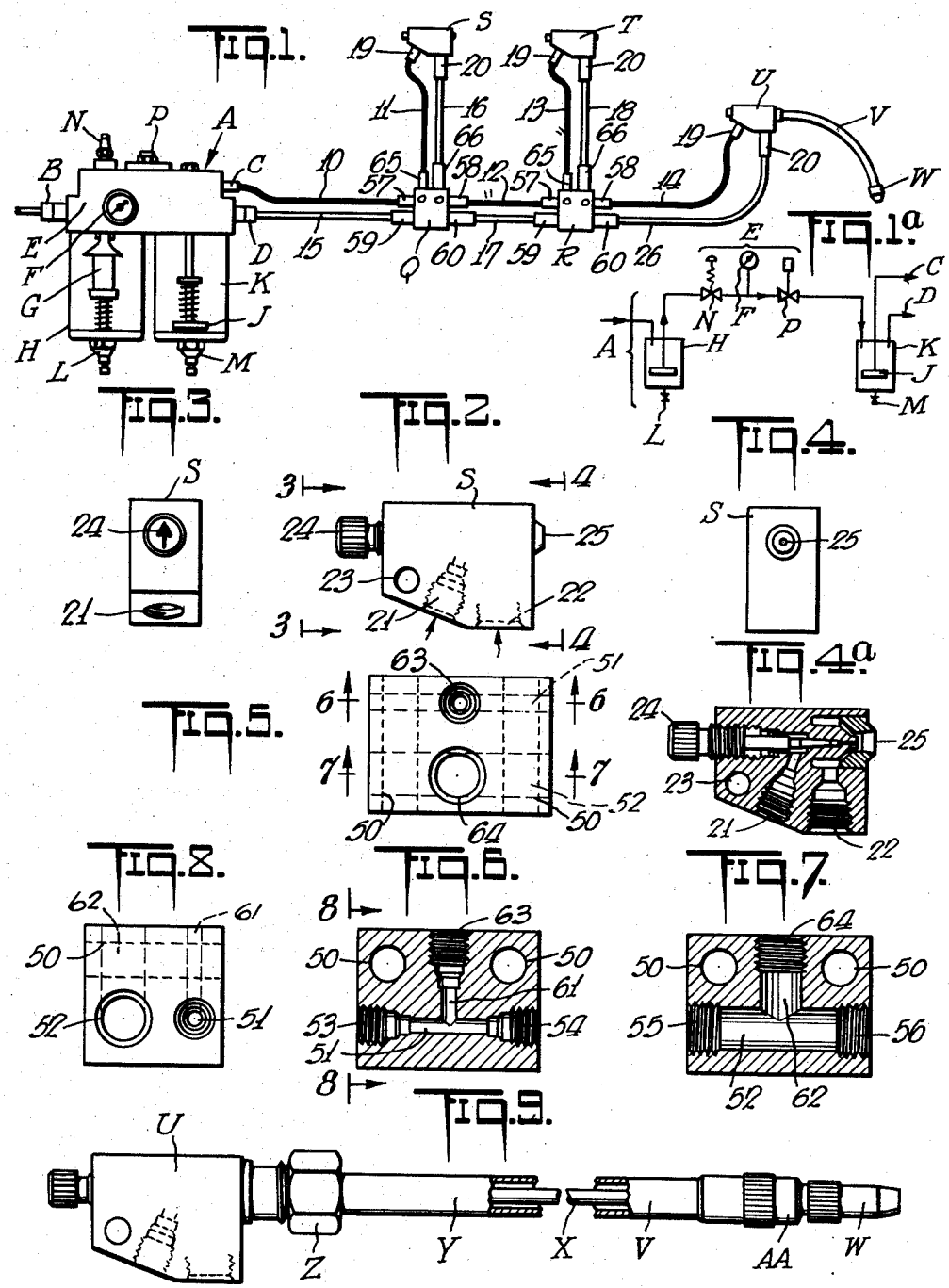
INVENTOR
Thomas R. Thomas
BY
Dean Fairbank & Hirsch
ATTORNEYS

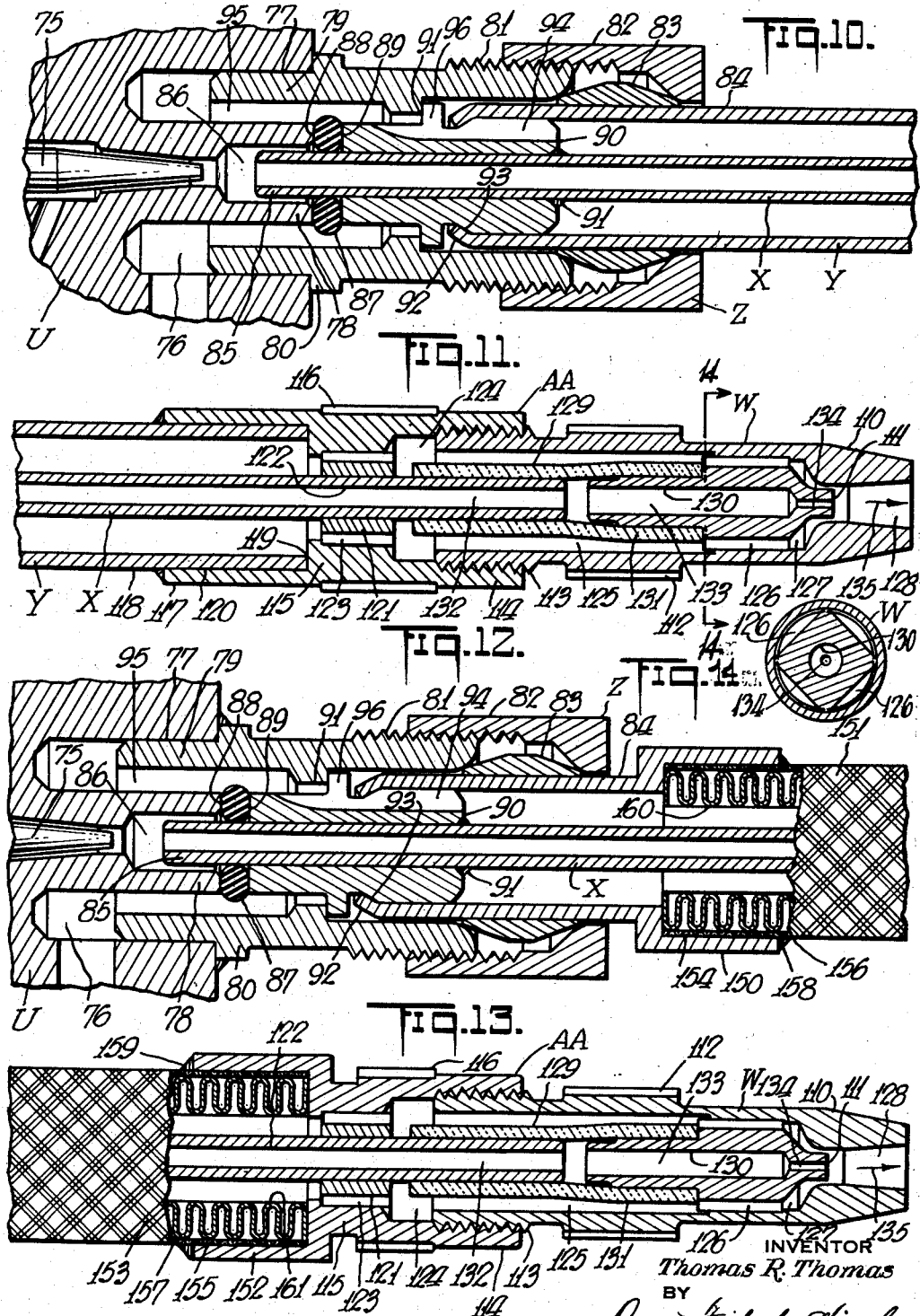

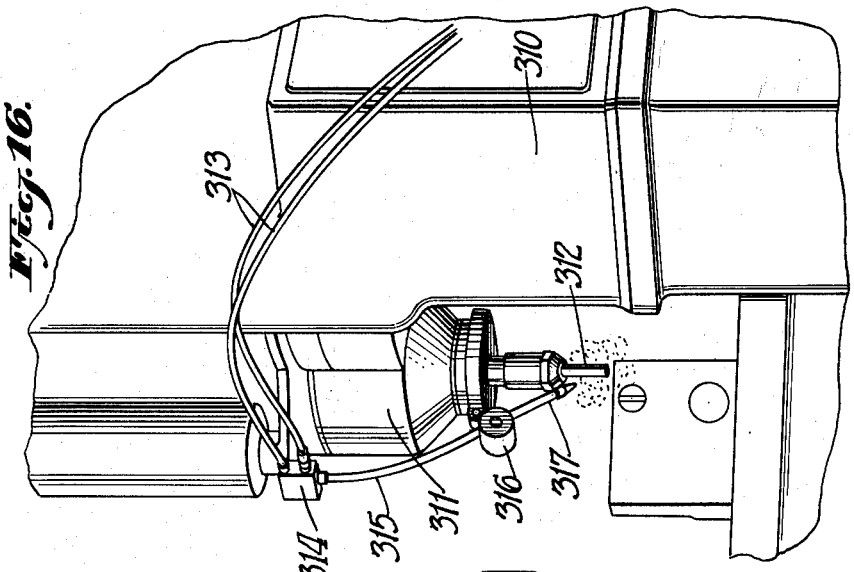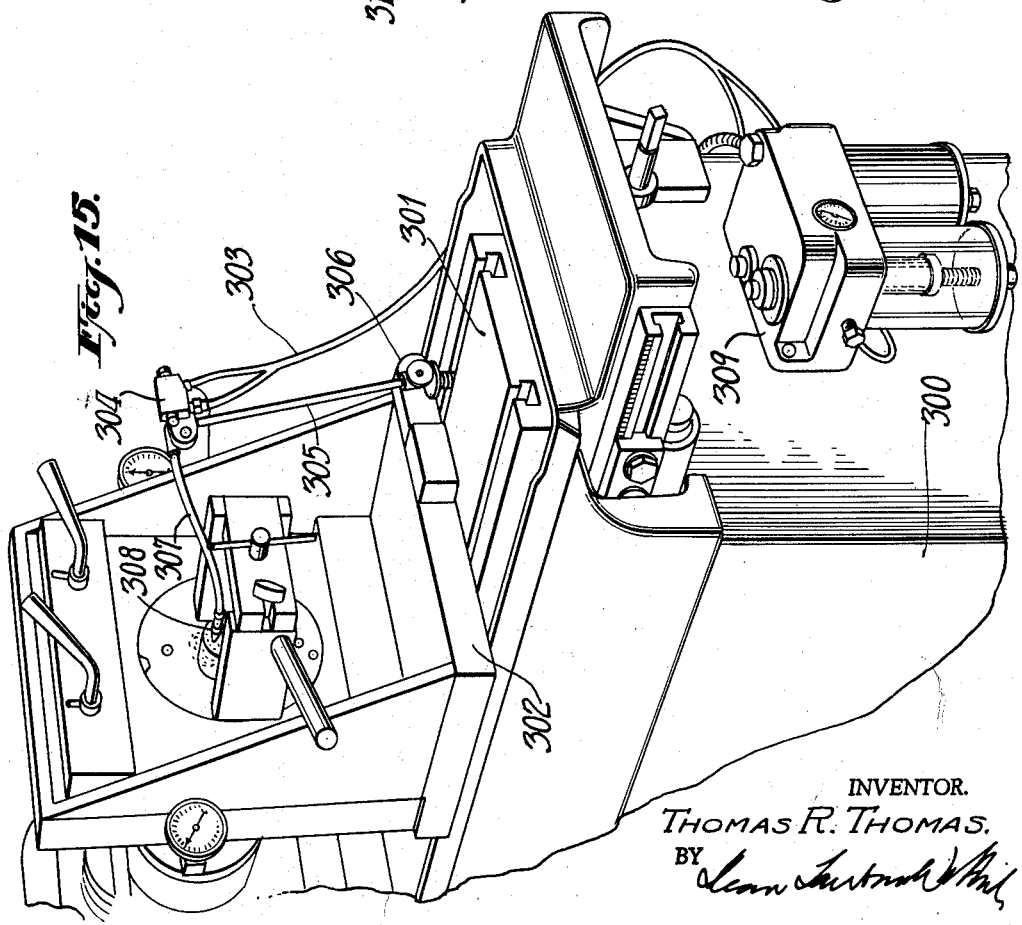

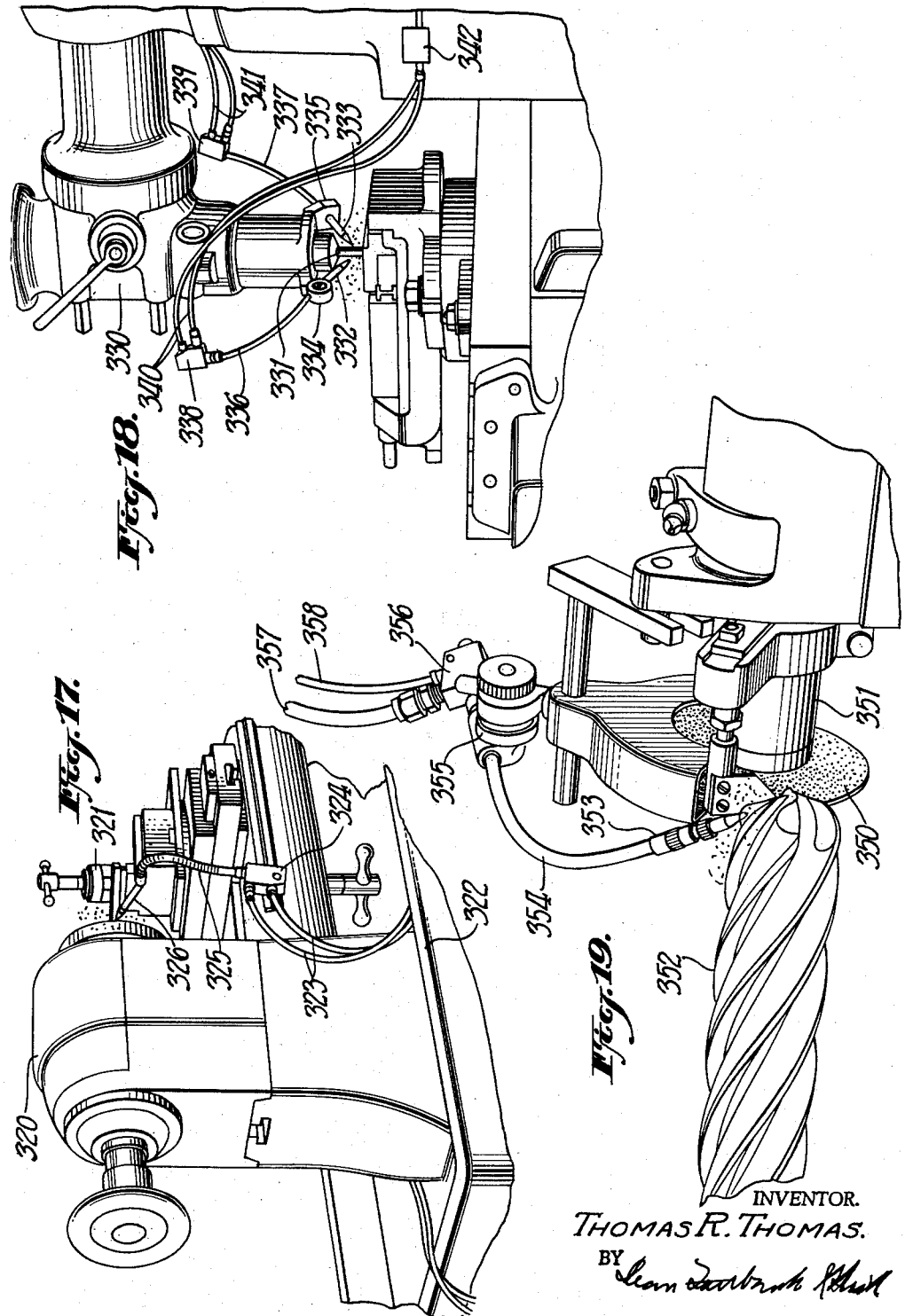

Oct. 8, 1963
T. R. THOMAS
3,106,346
SYSTEM FOR DISTRIBUTING FLUIDS
Filed April 30, 1958
5 Sheets-Sheet 5
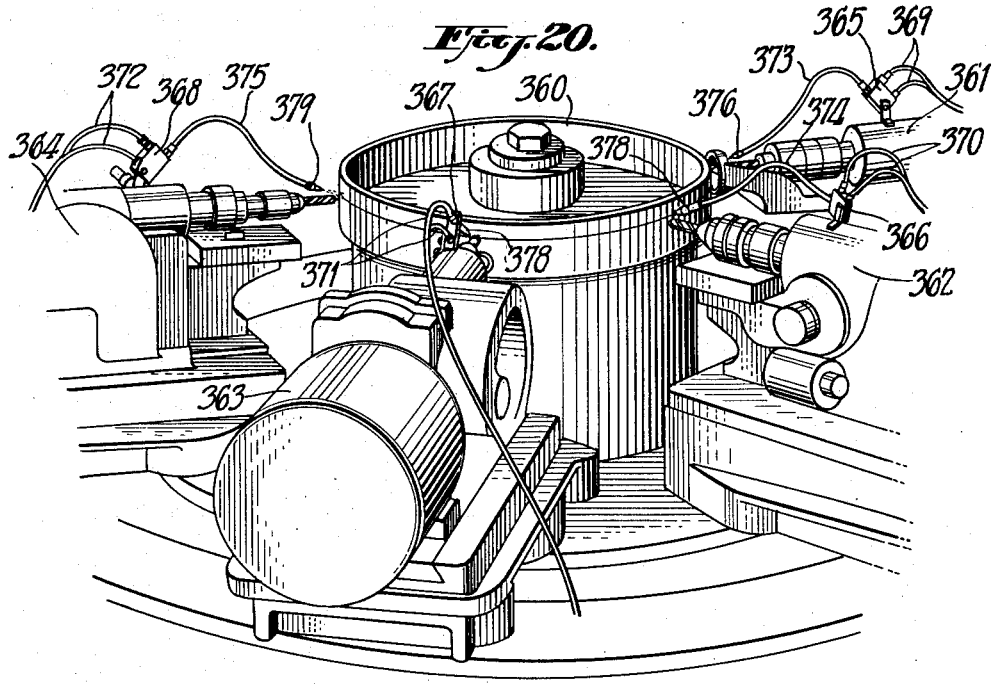
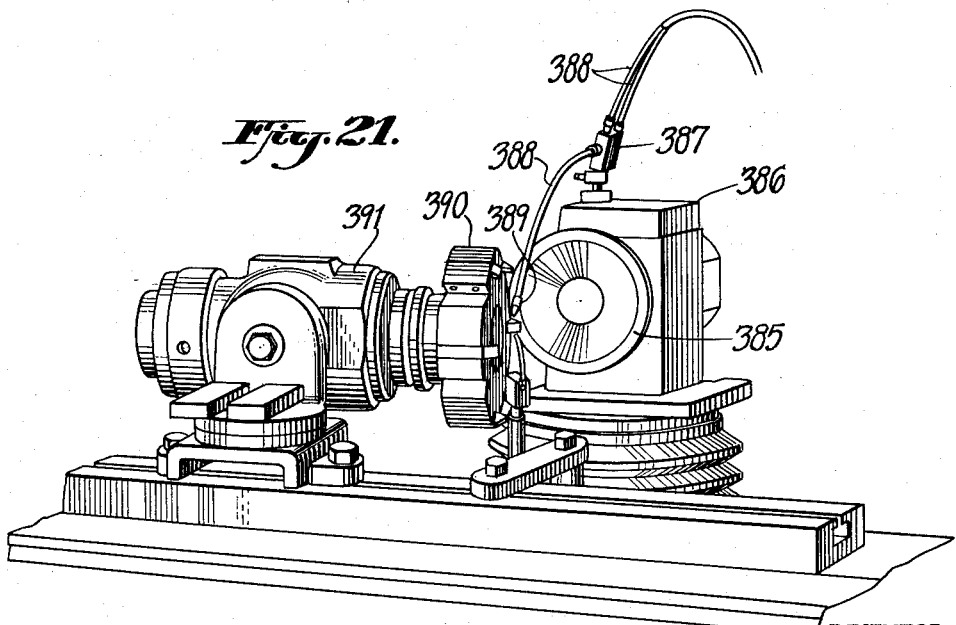
INVENTOR.
THOMAS R. THOMAS.
BY
ATTORNES.

United States Patent Office 3,106,346
Patented Oct. 8, 1963

1

3,106,346
SYSTEM FOR DISTRIBUTING FLUIDS
Thomas R. Thomas, New York, N.Y., assignor to Auto Research Corporation, Dover, Del., a corporation of Delaware
Filed Apr. 30, 1958, Ser. No. 731,908
4 Claims. (Cl. 239—366)

The present invention relates to a system for distributing lubricant or oil to chains, gears, and other machine parts, but it is particularly designed for the application of coolants to cutting and grinding operations.

It is among the objects of the present invention to provide a simple, inexpensive, reliable distribution system of oil for application to chains, gears, and other machine parts or for application of coolants to cutting or grinding operations in which there will be a central source and a plurality of remote distributing outlets at the point of application of the oil or coolant.

Another object of the present invention is to provide a simple, reliable distributing system which may be readily used with nearly all types of oils regardless of viscosities and changing temperature and humidity and which is also equally adaptable to a wide variety of standard water base coolants.

A further object of the present invention is to provide a distributing system in which compressed air and liquid under pressure will be supplied to a plurality of spaced and separated outlets for application to the machine part or cutting or grinding operation, which is to receive the lubricant or coolant application.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it is desirable to provide a simple source of both air pressure and liquid with the air pressure being controlled and set at a predetermined value and acting to exert pressure and force the liquid to be distributed through distributing lines.

The central source will normally constitute a combination air trap, air pressure reduction unit and liquid pressurizing device. This central source will include in one compact unit a moisture trap, an air filter, a pressure regulator, a pressure gauge, a solenoid valve, the liquid reservoir, a liquid filter and a junction box.

From this central control unit parallel lines or concentric lines will extend to junction units which in turn will supply mixing valves in which the air and liquid or lubricant are combined to form a stream which has a suitable adjustment to adjust the liquid flow, for example, by a needle valve.

These jet units may apply a jet directly onto the bearing or they may be provided with tube or hose connections to convey such jet to a unit.

With the foregoing and other objects in view, the invention consists of the novel construction, combination, and arrangement of parts as hereinafter more specifically described and illustrated in the accompanying drawings wherein is shown an embodiment of the inventon, but it

2 is to be understood that changes, variations and modifications can be resorted to which fall within the scope of the claims hereunto appended.

In the drawings wherein like reference characters denote corresponding parts throughout the several views:

FIGURE 1 is a diagrammatic layout of a central source and distributing system according to the present invention.

FIG. 1a is a diagrammatic layout of the arrangement of the central source which feeds the air under pressure as well as the pressurized liquid to the distributing system.

FIG. 2 is a side elevational view of a jet unit.

FIG. 3 is an end elevational view of the jet unit taken upon the line 3—3 of FIG. 2, showing the liquid flow adjustment.

FIG. 4 is an end elevational view of the jet unit of FIG. 2, taken upon the line 4—4 of FIG. 2, showing the spray outlet.

FIG. 4a is a transverse sectional view of the unit of FIGS. 2–4, showing the interior construction of the unit of FIGS. 2–4.

FIG. 5 is a top view of a junction unit box double T.

FIG. 6 is a transverse vertical sectional view upon the line 6—6 of FIG. 5.

FIG. 7 is a transverse vertical sectional view upon the line 7—7 of FIG. 5

FIG. 8 is an end view taken from the lines 8—8 of FIGS. 5, 6 and 7.

FIG. 9 is a side elevational layout view of the right end portion of FIG. 1, showing an extended double concentric tubular connection to a remote projection tip.

FIG. 10 is a transverse longitudinal sectional view of left end of FIG. 9 upon an enlarged scale.

FIG. 11 is a transverse longitudinal sectional view of right end of FIG. 9 upon an enlarged scale.

FIG. 12 is an alternative transverse longitudinal sectional view of an alternative of a concentric hose connection similar to FIG. 10, but showing a different construction.

FIG. 13 is an alternative transverse longitudinal sectional view of a hose connection similar to FIG. 11.

FIG. 14 is a transverse sectional view upon line 14—14 of FIG. 11.

FIG. 15 is a top perspective view of a portion of a machine boring tool showing the distributing system of the present application applied thereto.

FIG. 16 is a side perspective view showing an elevational arrangement in which the nozzle is directed upwardly toward the work in connection with a drill.

FIG. 17 is a pressure side perspective view of a machine tool showing the spray applicator being directed upwardly toward the work.

FIG. 18 is a fragmentary side perspective view of a drill showing two nozzles being directed at opposite angles thereupon.

FIG. 19 is a fragmentary side perspective view of an alternative form of machine tool showing the applicator being directed downwardly along the cutting contact area.

FIG. 20 is a top perspective view of a turret type machine tool showing the applicators arranged peripherally and radially with one applicator being used for each tool.

FIG. 21 is a fragmentary top perspective view showing a machine tool with the applicator directed downwardly along the side of the work.

Referring to FIGS. 1 and 1a, there is shown a central source of air pressure and lubricant or liquid pressure A having an inlet B for compressed air, and an outlet C for the liquid under pressure and an outlet D for the compressed air from the central unit.

The head E receives a pressure gauge F and an air filter G, an air receptacle H, a liquid filter J, a liquid receptacle K and the drain cocks or valves L and M.

The drain cocks or valves L and M allow periodic removal of water and/or impurities which have been filtered out and deposited in the lower part of the receptacles H and K.

The central unit is also provided with a diaphragm pressure regulator N which is manually adjustable and a solenoid control valve P.

The liquid in the casing K will be under an air pressure and will be forced through the liquid outlet C under such air pressure.

The liquid will flow through the lines 10, 11, 12, 13 and 14 to and through the junctions Q and R and to the junction units S, T and U.

The junction unit U has a tubular extension V to the remote spray outlet nozzle W.

The air will flow through the piping or tubing connections 15, 16, 17, 18 and 26 through and to the same junctions Q and R and also to the junction units S, T and U.

The junction units are best shown in FIGS. 2, 3, 4 and 4a.

As shown, for example, in FIG. 1, there are coupling connections indicated at 19 and 20 to the junction units S, T and U.

These junction units have the tapped recesses 21 and 22 which receive the coupling connections 19 and 20 and they are provided with openings 23 for mounting upon the structure.

The left side of the unit of FIG. 2 is provided with the liquid flow adjustment 24 which may take the form of a needle valve and will regulate the flow of liquid.

The other side of the unit of FIG. 2 has a spray or mist outlet 25 from which the spray or mist of lubricant, oil or coolant may be projected onto the bearing.

The junctions Q and R are best shown in FIGS. 5, 6, 7 and 8.

These junctions consist of rectangular metal blocks and they have the mounting openings 50.

Each of the junctions is provided with through passageways 51 and 52, respectively, for liquid and air, which passageways are provided with the tapped connections 53 and 54 and 55 and 56 for the compression coupling connections 57, 58 and 59, 60, respectively.

The blocks are also provided with the transverse T connections 61 and 62 terminating in the tapped openings 63 and 64 which lead to the units S and T, as shown in FIG. 1 and which carry the compression coupling connections 65 and 66, respectively.

As shown in FIGS. 2-8, respectively, the liquid whether it be lubricant, oil or coolant is separately conveyed from the air under pressure through the junctions Q and R and to the junction units S, T and U where it is combined to form a spray or mist which is then applied to the bearing, gear, or other machine unit or to the cutting or grinding operation, as the case may be.

The lines 10 and 15, 11 and 16, 12 and 17, 13 and 18 and 14 and 26 may be combined in concentric tubing connections as shown in FIGS. 9 to 13, but in the embodiment shown these concentric tubing connections are limited to the unit V shown in FIG. 1 which conveys the air and lubricant to a remote jet point.

Referring to FIG. 9 it will be noted that there is an inside connection X for the air and an outside or outer connection Y which are concentrically disposed and which at each end have concentric connections Z and AA, respectively, to the unit U and to the tip W.

The junction unit U has a central passageway with a needle valve 75 for the liquid and an annular passageway or chamber 76 for the air, as shown best in FIG. 10.

There is a recess 77 and a projecting nipple 78. The recess 77 receives the outside element 79 which is stopped by the shouldered enlargement 80.

The connection end Z also has a threaded end portion 81 which receives a compression coupling nut 82 to crimp the double tapered coupling sleeve 83 onto the inside end 84 of the outer tubular element Y. The outer tubular element Y encircles the inner tubular element X.

The inside end of X has an extension at 85 projecting into the recess 86 and a seal is made by the compressed rubber O ring 87 which is compressed between the end 88 of the nipple 78 and the end 89 of the connection member 90.

The inside concentric connection 90 encircles the end 85 of the central element X and it is soldered in position at 91.

The end of the outer tubular element Y is turned inwardly as indicated at 92 to fit upon the inwardly beveled portion 93 of the unit 90.

The slot 94 establishes the air connection from the chamber 76 and from the passageway 95 to the outer tube Y.

The shoulder or extension 96 will stop the unit 90 against the shoulder 91 of the body member Z.

It will be noted that the connection as shown in FIG. 10 will enable flow of both the air and the liquid separately into the double tubular unit X—Y with the liquid flowing through the central opening and the air flowing through the outer tubular member Y.

At the other end the concentric tubing X and Y will connect to the spray or mist jet unit W, as best shown in FIG. 11.

The mist jet unit W has an outer nozzle 110 and an inner nozzle 111. The outer nozzle 110 has a knurled portion 112 and a threaded portion 113 which screws into the tapped extension 114 of the structure 115. The knurling is also provided as indicated at 116.

The body 115 has the rearwardly extending sleeve 117 which fits around the outer tube 118 which is seated at the end 119 of the socket 120. The body 115 receives the central sleeve 121 through which passes the inner tube X, as indicated at 122.

There will be outer passages left at 123 for the air to flow from the outer tube Y into the chamber 124, the concentric passages 125 and 126 and into the space 127 and out through the nozzle opening 128.

The central tube X will pass from the position 122 into the sleeve 129 which extends over the interior portion 130 of the interior nozzle member 111, as indicated at 131.

The liquid will flow from the central passageway 132 through the center passageway 133 and then through the center bore 134 into the nozzle opening 128.

This will give the spray or jet of mixed air and lubricant or coolant the direction as indicated at 135 which will enable it to be sprayed or directed upon a bearing or machine element.

In the embodiment of FIGS. 12 and 13 the construction is the same and the same parts are indicated by the same numerals except that there is provided a side mount connection 150 to receive the flexible hose 151 at the other end 153 of the flexible hose.

It will be noted that the recesses 154 and 155 receive the outer lining 156 and 157 which is held in position by the solder joints 158 and 159.

The sinuous wall 160 and 161 will permit flexibility. The other elements are the same as already described in connection with FIGS. 10 and 11 and will give the same numerals and letters.

Referring to FIG. 15 there is shown a machine tool having a base 300 with a grooved slide support 310 having a boring member 302 carried thereon. The coolant and the air may be supplied by the conduit 303 to the junction 304. The junction unit 304 is mounted by an upward extending rod 305 mounted at 306. The flexible tube 307 is a spray nozzle 308 directed on to the work.

The coolant pressure source is indicated at 309.

Referring to FIG. 16 there is shown a head carrying the motor 311 which drives the drill 312. The air and coolant lines 313 extend to the junction 314. The flexible concentric conduit 315 is held in position by the holder member 316 which has the spray nozzle 317.

In the arrangement shown in FIG. 17, the machine tool head 320 is provided with a work holder 321 both of which are mounted on the base 322. The flexible hoses 323 lead to the junction element 324 which is mounted on the side of the machine.

The flexible concentric conduit 325 terminates in the applicator member 326. The machine tool shown in FIG. 18 has an adjustable head 330, with a drill 331 having the opposite obliquely inwardly directed spray applicators 332 and 333.

These spray applicators are held in position by the mounting elements 334 and 335. The flexible concentric conduits 336 and 337 lead downwardly from the junctions 338 and 339 which may be supported by the flexible members 336 and 337.

Each of the junctions will receive the coolant and air by the flexible tubing 340 and 341. These flexible tubes may originate from a central junction 342 mounted on the side of the machine.

Referring to FIG. 19, the grind wheel 350 is driven from the head 351 and it is applied to the work 352. The nozzle applicator 353 is mounted at the end of the concentric conduit 354 which in turn is mounted by the holder device 355. The junction 356 will be supplied by the tubing 357 and 358 with air and coolant.

In the embodiment of FIG. 20 there is shown a turret type member 360 which has a series of tools 361, 362, 363 and 364 arranged circumferentially. Each tool carries a junction 365, 366, 367 and 368 supplied with air and coolant through the flexible tubing 369, 370, 371 and 372.

The flexible concentric conduits are sufficiently rigid to hold their position as indicated at 373, 374 and 375 and they will supply the spray applicator nozzles 376, 378 and 379.

In the embodiment of FIG. 21, there is shown a cutter or grind wheel 385 mounted on the structure 386 on top of which is placed the junction 387. The junction 387 is fed by means of flexible tubing 388. From the junction 387 is fed the concentric conduit 388 which leads to the nozzle 389. Nozzle 389 applies a spray to the work at the head 390 carried by the body member 391.

These machine tool arrangements as shown in FIG. 15 to 21 illustrate the many applications of the present structure.

It is thus apparent that the applicant has provided a simple system for conveying oil lubricant or coolant or other liquid together with air to near or remote places of application from a central liquid and air pressure source with assurance that there will be satisfactory application of coolant or lubricant or oil to the machine element or to the place of grinding or cutting.

While there has been herein described a preferred form of the invention, it should be understood that the same may be altered in details and in relative arrangement of parts within the scope of the appended claims.

Having now particularly described and ascertained the nature of the invention, and in what manner the same is to be performed.

What is claimed is:

1. In an applicator system for supplying an air stream of a finely divided liquid coolant onto a cutting tool and the place where the cut is being made, of the type having a central compressed air source including a mounting head and comprising a coolant reservoir, and a two-line branched distributing system, one line for compressed air and the other line for coolant, said head having a compressed air inlet, a compressed air outlet leading to said one line, a coolant outlet leading to said other line, passageways connecting said compressed air inlet to said compressed air outlet via said coolant reservoir, and passageways connecting said coolant reservoir to said coolant outlet; a spray unit for mixing said compressed air and said coolant, said spray unit comprising a junction unit having a compressed air inlet connected to said one line and a coolant inlet connected to said other line, a compressed air outlet and a coolant outlet, said compressed air outlet in said junction unit being concentric with, and surrounding, said coolant outlet in said junction unit, a compressed air flexible tube having two ends, a coolant flexible tube having two ends, said air flexible tube being concentric to and surrounding said coolant flexible tube, a first end of said compressed air and coolant flexible tubes being connected to said compressed air and coolant outlets in said junction unit, respectively, a manually controllable coolant flow adjustment needle valve in said junction unit and a double concentric nozzle outlet unit at the other ends of said compressed air and coolant tubes, respectively, said double concentric nozzle outlet unit having an inside nozzle for said coolant and an outside nozzle for said compressed air, whereby said compressed air from said central source causes coolant to be forced from said reservoir through said coolant outlet in said head, then though said other line of said branched distributing system to said junction unit, then through said junction unit and said coolant flexible tube to said inside nozzle, said compressed air and coolant being mixed and finely divided only at said nozzle outlet unit and outside and inside concentric connections connecting the outlets in said junction unit with said first end of said flexible tube, an outside element having a pressed fit at its one end with respect to said junction unit, a compression coupling connection including a coupling sleeve mounted on the air tube, and a coupling nut threaded on the opposite end of the outside element and holding said coupling sleeve against the air tube and said outside element, an inside concentric connection mounted on the coolant tube, an O ring mounted on said coolant tube and arranged between the inner end of the inside concentric connection and the junction unit to seal the coolant tube to the junction unit, said inside concentric connection centering the coolant tube with respect to the air tube, and having air passageways therein to permit flow of air from the junction outlet to the air tube.

2. The system of claim 1, said compressed air and coolant outlet in said junction unit and said double concentric nozzle outlet unit having telescoping connections with said compressed air and coolant flexible tubes, respectively.

3. The applicator system of claim 1, a mounting unit positioned on the outside of said compressed air flexible tube between the ends thereof enabling said flexible tube to be directed to the place where the cut is being made.

4. The applicator system of claim 1, a cylindrical mounting member for said compressed air flexible tube comprising a transverse dimetrical opening therethrough for said tube and means to mount said cylindrical unit adjacent to the place where the cut is being made.

References Cited in the file of this patent

UNITED STATES PATENTS

| | | |
|---|---|---|
| 567,452 | Cleaver | Sept. 8, 1896 |
| 591,576 | Thompson et al. | Oct. 12, 1897 |
| 1,182,360 | Dies | May 9, 1916 |
| 1,196,691 | Hopkins | Aug. 29, 1916 |
| 1,239,075 | Bagnall et al. | Sept. 4, 1917 |

(Other references on following page)

UNITED STATES PATENTS

| | | |
|---|---|---|
| 1,272,438 | Heinrich | July 16, 1918 |
| 1,701,218 | Seaboldt | Feb. 5, 1929 |
| 1,957,705 | Ferguson | May 8, 1934 |
| 2,041,543 | Guarnaschelli | May 19, 1936 |
| 2,181,002 | Warner | Nov. 21, 1939 |
| 2,182,811 | Kocher | Dec. 12, 1939 |
| 2,203,210 | Young | June 4, 1940 |
| 2,240,413 | Parker | Apr. 29, 1941 |
| 2,277,928 | McKee | Mar. 31, 1942 |
| 2,398,618 | Chavayda | Apr. 16, 1946 |
| 2,450,314 | Vandervoort | Sept. 28, 1948 |
| 2,556,047 | Stanley | June 5, 1951 |
| 2,676,471 | Pierce | Apr. 27, 1954 |
| 2,779,627 | Gray | Jan. 29, 1957 |
| 2,790,679 | Martindale | Apr. 30, 1957 |
| 2,804,339 | Barbour et al. | Aug. 27, 1957 |
| 2,850,323 | Veres | Sept. 2, 1958 |
| 2,953,305 | Bondurant | Sept. 20, 1960 |

FOREIGN PATENTS

| | | |
|---|---|---|
| 118,388 | Sweden | Mar. 18, 1947 |
| 1,011,346 | France | Apr. 2, 1952 |